United States Patent
Kung et al.

(10) Patent No.: US 8,269,461 B2
(45) Date of Patent: Sep. 18, 2012

(54) HYBRID BATTERY CHARGER AND CONTROL CIRCUIT AND METHOD THEREOF

(75) Inventors: Nien-Hui Kung, Hsinchu (TW); Kwan-Jen Chu, Hsinchu (TW)

(73) Assignee: Richtek Technology Corp., Hsinchu (TW)

( * ) Notice: Subject to any disclaimer, the term of this patent is extended or adjusted under 35 U.S.C. 154(b) by 317 days.

(21) Appl. No.: 12/831,494

(22) Filed: Jul. 7, 2010

(65) Prior Publication Data

US 2011/0006728 A1    Jan. 13, 2011

(30) Foreign Application Priority Data

Jul. 10, 2009   (TW) ................................ 98123457 A

(51) Int. Cl.
*H01M 10/44*   (2006.01)
*H01M 10/46*   (2006.01)
(52) U.S. Cl. ...................................... 320/128
(58) Field of Classification Search .................. 320/107, 320/114, 128, 132, 134, 136, 139, 145
See application file for complete search history.

(56) References Cited

U.S. PATENT DOCUMENTS

| | | | | |
|---|---|---|---|---|
| 4,980,812 A | * | 12/1990 | Johnson et al. | 363/44 |
| 2004/0067740 A1 | * | 4/2004 | Handa et al. | 455/127.1 |
| 2005/0017676 A1 | * | 1/2005 | Takimoto et al. | 320/107 |

* cited by examiner

*Primary Examiner* — Edward Tso
(74) *Attorney, Agent, or Firm* — Rosenberg, Klein & Lee

(57) ABSTRACT

A hybrid battery charger includes a control circuit and a power stage. The control circuit includes an error amplifier to generate a first error signal and a second error signal according to an output voltage and an output current of the hybrid battery charger, a linear controller to generate a first control signal according to the first error signal, a PWM controller to generate a second control signal and a third control signal according to the second error signal, and according to a mode signal, a multiplexer to select the first control signal for the power stage to operate the hybrid battery charger in a linear mode, or the second and third control signals for the power stage to operate the hybrid battery charger in a switching mode.

6 Claims, 5 Drawing Sheets

HYBRID BATTERY CHARGER AND CONTROL CIRCUIT AND METHOD THEREOF

FIELD OF THE INVENTION

The present invention is related generally to a charger and, more particularly, to a hybrid battery charger and control circuit and method thereof.

BACKGROUND OF THE INVENTION

There are two kinds of battery chargers, one is of linear type and the other is of switching type. FIG. 1 is a schematic diagram of a switching battery charger, and FIG. 2 is a schematic diagram of a linear battery charger.

In a switching battery charger, as shown in FIG. 1, an error amplifier 12 detects the output voltage VOUT at the power output terminal of the switching battery charger and the output current IOUT flowing through a current sense resistor $R_D$ to generate an error signal EA and according thereto, a pulse width modulation (PWM) controller 10 provides control signals PWM1 and PWM2 to switch a pair of upper bridge transistor 14 and lower bridge transistor 16, respectively, to convert an input voltage VIN received by a power input terminal of the switching battery charger into a current with an inductor L to supply the output current IOUT to charge a battery Bat at the power output terminal VOUT.

In a linear battery charger, as shown in FIG. 2, an error amplifier 22 detects the output voltage VOUT at the power output terminal of the linear battery charger to generate an error signal EA and according thereto, a linear controller 20 provides a control signal VG for controlling a transistor 24 to supply an output current IOUT to charge a battery Bat at the power output terminal VOUT.

These two kinds of battery chargers have respective advantages and disadvantages. The linear battery charger is a simple solution but will suffer poor efficiency issue; while the switching battery charger has better efficiency but will suffer electromagnetic interference (EMI) issue. Therefore, designers always select either one of them for applications depending on the practical demands of circuits.

SUMMARY OF THE INVENTION

An object of the present invention is to provide a hybrid battery charger.

Another object of the present invention is to provide a control circuit for a hybrid battery charger.

Yet another object of the present invention is to provide a control method for a hybrid battery charger.

According to the present invention, a hybrid battery charger includes an output stage connected to a power input terminal and a power output terminal, an error amplifier to generate a first error signal and a second error signal according to an output voltage and an output current of the hybrid battery charger, a linear controller to generate a first control signal according to the first error signal, a PWM controller to generate a second control signal and a third control signal according to the second error signal, and according to a mode signal, a multiplexer to select the first control signal for the output stage to operate the hybrid battery charger in a linear mode or to select the second and third control signals for the output stage to operate the hybrid battery charger in a switching mode.

According to the present invention, a control circuit for a hybrid battery charger includes an error amplifier to generate a first error signal and a second error signal according to an output voltage and an output current of the hybrid battery charger, a linear controller to generate a first control signal according to the first error signal, a PWM controller to generate a second control signal and a third control signal according to the second error signal, and a multiplexer to select either the first control signal or the second and third control signals according to a mode signal.

According to the present invention, a control method for a hybrid battery charger includes generation of a first error signal and a second error signal according to an output voltage and an output current of the hybrid battery charger, generation of a first control signal according to the first error signal, generation of a second control signal and a third control signal according to the second error signal, and according to a mode signal, selecting the first control signal to operate the hybrid battery charger in a linear mode or selecting the second and third control signals to operate the hybrid battery charger in a switching mode.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAIL DESCRIPTION OF THE INVENTION

Figure 1:
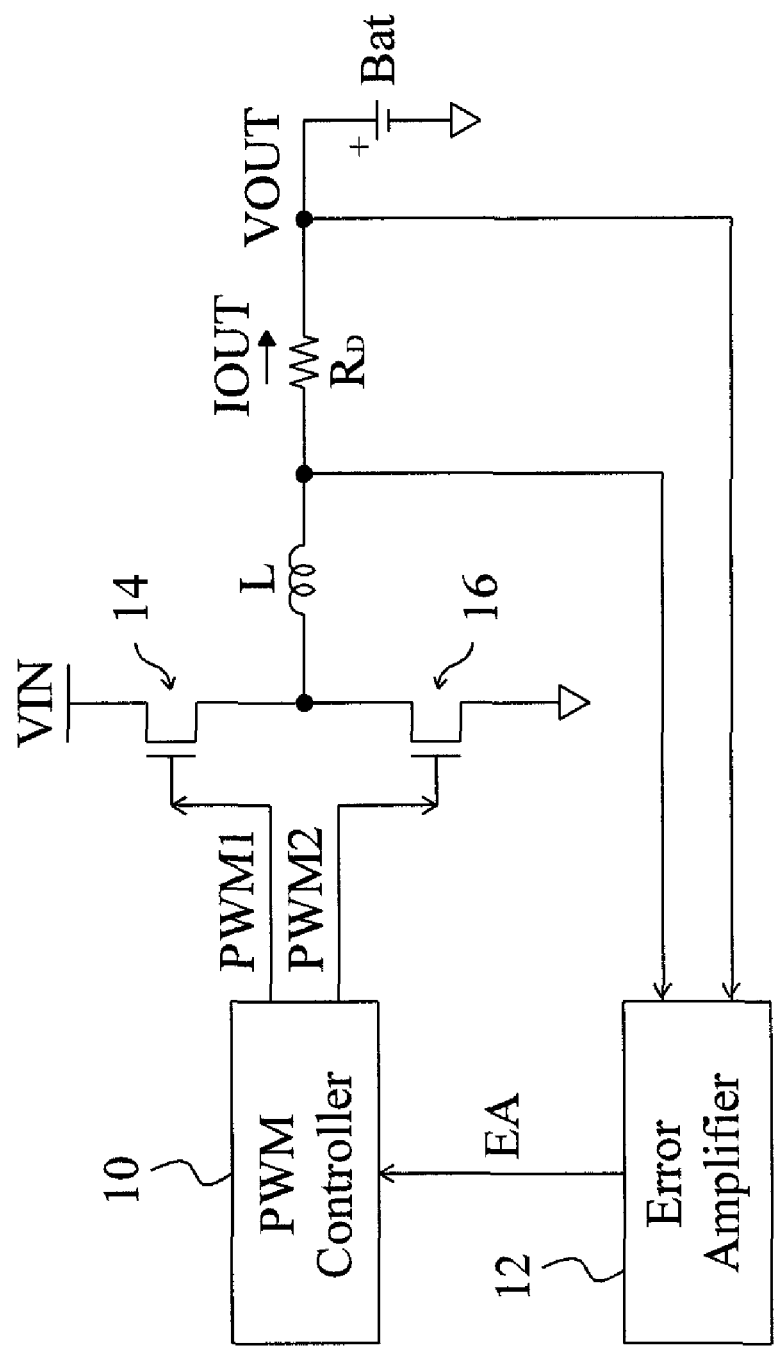
FIG. 1 is a schematic diagram of a conventional switching battery charger.
Figure 2:
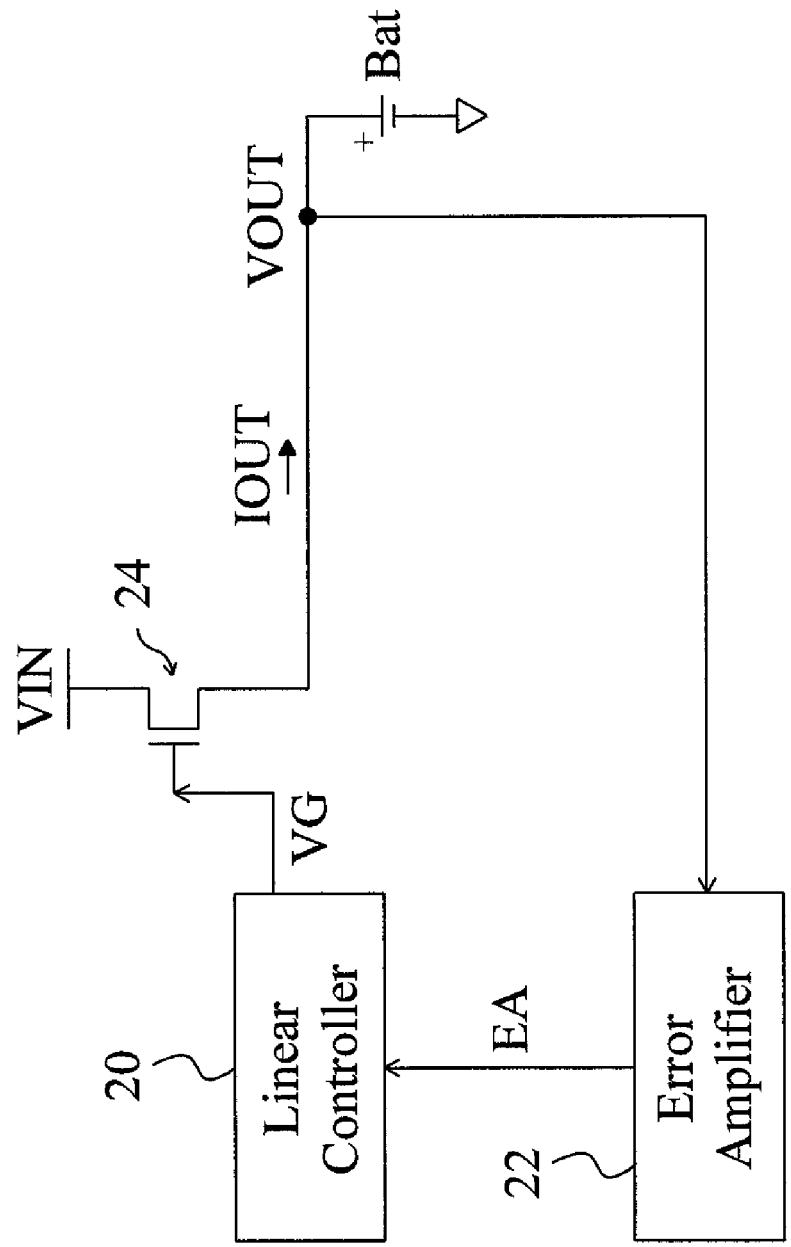
FIG. 2 is a schematic diagram of a conventional linear battery charger.
Figure 3:
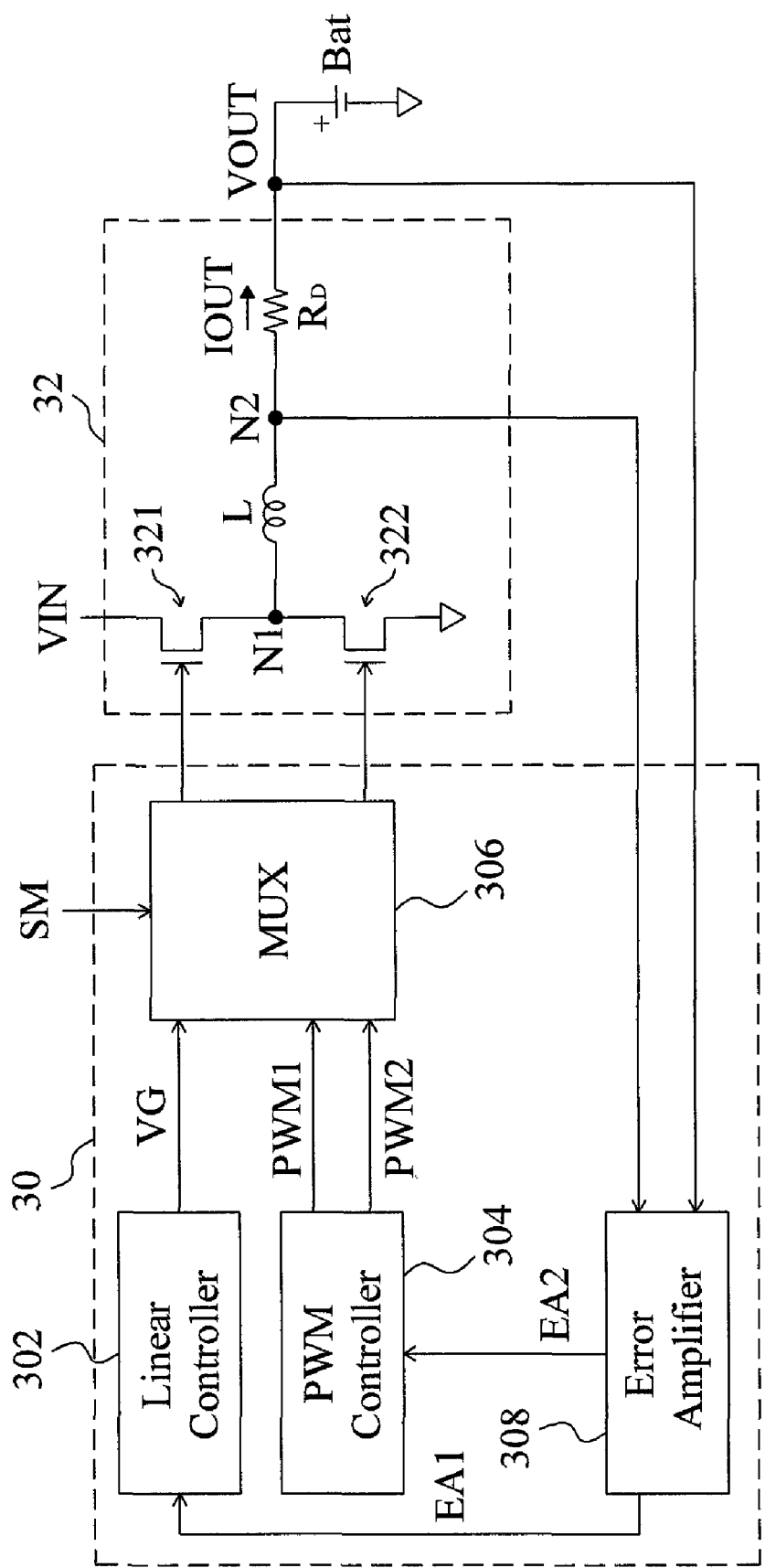
FIG. 3 is a schematic diagram of a first embodiment according to the present invention.

FIG. 3 is a schematic diagram of a first embodiment according to the present invention, in which a hybrid battery charger includes a control circuit 30 and an output stage 32. In the control circuit 30, a linear controller 302 and a PWM controller 304 are connected to a multiplexer 306, an error amplifier 308 detects the output voltage VOUT at the power output terminal of the hybrid battery charger and the output current IOUT flowing through a current sense resistor $R_D$ to generate error signals EA1 and EA2 for the linear controller 302 and the PWM controller 304, respectively, the linear controller 302 generates a control signal VG according to the error signal EA1, the PWM controller 304 generates control signals PWM1 and PWM2 according to the error signal EA2, and according to a mode signal SM, the multiplexer 306 determines to operate the hybrid battery charger in a linear mode by the control signal VG or to operate the hybrid battery charger in a switching mode by the control signals PWM1 and PWM2. In the output stage 32, a transistor 321 is connected between a power input terminal VIN of the hybrid battery charger and a node N1, a transistor 322 is connected between the node N1 and a ground terminal, the transistors 321 and 322 are controlled by the signals provided by the multiplexer 306, an inductor L is connected between the node N1 and a node N2, and the current sense resistor $R_D$ is connected between the node N2 and the power output terminal VOUT. When the hybrid battery charger operates in a linear mode, the multiplexer 306 selects the control signal VG for the output stage 32 to control the transistor 321, and the transistor 322 is kept off. When the hybrid battery charger operates in a switching mode, the multiplexer 306 selects the control signals PWM1 and PWM2 for the output stage 32 to switch the transistors 321 and 322, respectively, so that an input voltage VIN is converted into an output voltage VOUT and an output current IOUT is supplied to charge a battery Bat.

Figure 4:
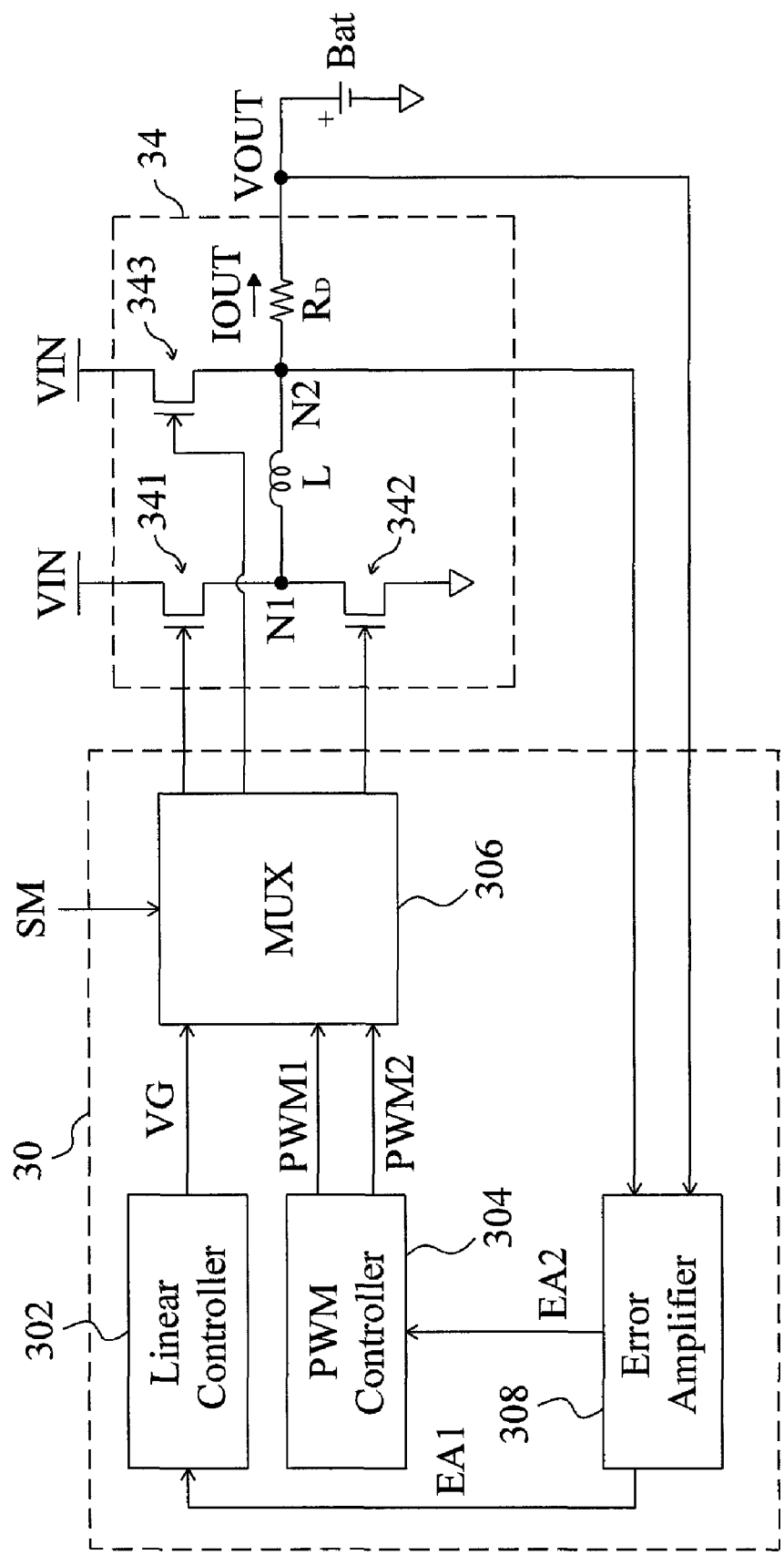
FIG. 4 is a schematic diagram of a second embodiment cording to the present invention.

FIG. 4 is a schematic diagram of a second embodiment according to the present invention. In this embodiment, the control circuit 30 is identical to that in the embodiment of FIG. 3. In an output stage 34, however, a transistor 341 is connected between a power input terminal VIN of the hybrid battery charger and a node N1, a transistor 342 is connected between the node N1 and a ground terminal, a transistor 343 is connected between the power input terminal VIN and a node N2, an inductor L is connected between the nodes N1 and N2, and a current sense resistor $R_D$ is connected between the node N2 and the power output terminal VOUT. When the hybrid battery charger operates in a linear mode, the multiplexer 306 selects the control signal VG for the output stage 34 to control the transistor 343, and both the transistors 341 and 342 are kept off, so the output current IOUT is supplied from the power input terminal VIN to the power output terminal VOUT through the transistor 343 and the current sense resistor $R_D$. When the hybrid battery charger operates in a switching mode, the multiplexer 306 selects the control signals PWM1 and PWM2 for the output stage 34 to switch the transistors 341 and 342, respectively, and the transistor 343 is kept off, so that the input voltage VIN is converted into the output voltage VOUT and the output current IOUT is supplied to charge a battery Bat.

Figure 5:
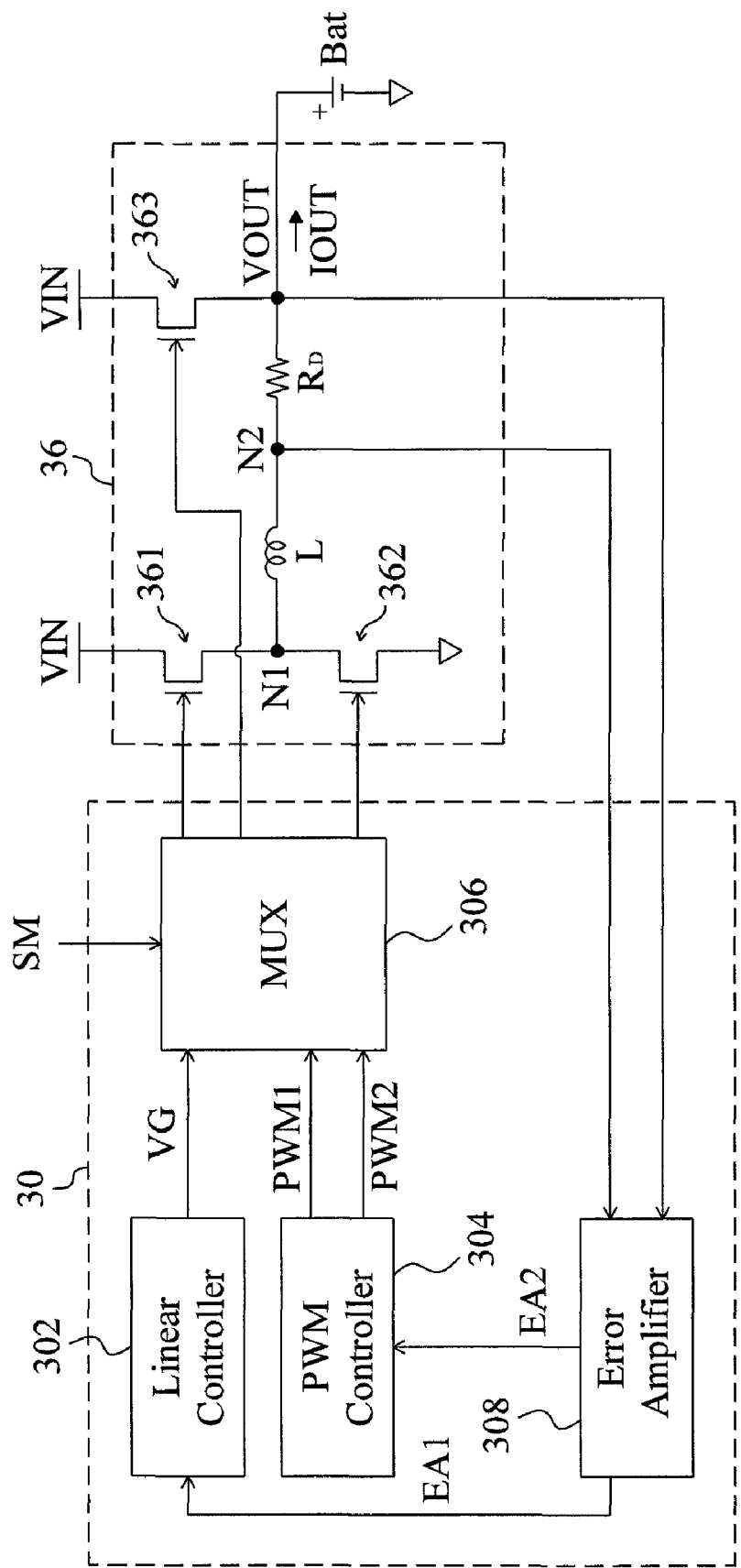
FIG. 5 is a schematic diagram of a third embodiment cording to the present invention.

FIG. 5 is a schematic diagram of a third embodiment according to the present invention. In this embodiment, the control circuit 30 is identical to that in the embodiment of FIG. 3. In an output stage 36, however, a transistor 361 is connected between a power input terminal VIN of the hybrid battery charger and a node N1, a transistor 362 is connected between the node N1 and a ground terminal, an inductor L is connected between the node N1 and a node N2, a current sense resistor $R_D$ is connected between the node N2 and the power output terminal VOUT, and a transistor 363 is connected between the power input terminal VIN and the power output terminal VOUT. When the hybrid battery charger operates in a linear mode, the multiplexer 306 selects the control signal VG for the output stage 36 to control the transistor 363 and both the transistors 361 and 362 are kept off, so the output current IOUT is supplied from the power input terminal VIN to the power output terminal VOUT through the transistor 363. When the hybrid battery charger operates in a switching mode, the multiplexer 306 selects the control signals PWM1 and PWM2 for the output stage 36 to switch the transistors 361 and 362, respectively, and the transistor 363 is kept off, so that the input voltage VIN is converted into the output voltage VOUT and the output current IOUT is supplied to charge a battery Bat. In this embodiment, the output current IOUT in a linear mode does not flow through the current sense resistor $R_D$, so power consumption of the current sense resistor $R_D$ is removed and efficiency is further improved.

The hybrid battery chargers according to the present invention have good adaptability and can switch between operational modes according to the current demands of a system. For example, if a system needs better EMI performance, the hybrid battery charger is switched by the mode signal SM into a linear mode; if a system does not care EMI performance but needs high efficiency, the hybrid battery charger is switched by the mode signal SM into a switching mode. In other embodiments, the mode selection may be decided by thermal requirement or other practical demands.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A hybrid battery charger, comprising:
    a power input terminal for receiving an input voltage;
    a power output terminal for supplying an output voltage and an output current;
    an output stage connected to the power input terminal and the power output terminal;
    an error amplifier connected to the output stage, operative to generate a first error signal and a second error signal according to the output voltage and the output current;
    a linear controller connected to the error amplifier, operative to generate a first control signal according to the first error signal;
    a PWM controller connected to the error amplifier, operative to generate a second control signal and a third control signal according to the second error signal; and
    a multiplexer connected to the linear controller, the PWM controller, and the output stage, and according to a mode signal, operative to select the first control signal for the output stage to operate the hybrid battery charger in a linear mode or select the second and third control signals for the output stage to operate the hybrid battery charger in a switching mode.

2. The hybrid battery charger of claim 1, wherein the output stage comprises:
    a first transistor connected between the power input terminal and a first node, for being controlled by the first control signal in the linear mode and controlled by the second control signal in the switching mode;
    a second transistor connected between the first node and a ground terminal, for being controlled by the third control signal in the switching mode and kept off in the linear mode;
    an inductor connected between the first node and a second node; and
    a current sense resistor connected between the second node and the power output terminal.

3. The hybrid battery charger of claim 1, wherein the output stage comprises:
    a first transistor connected between the power input terminal and a first node, for being controlled by the second control signal in the switching mode and kept off in the linear mode;
    a second transistor connected between the first node and a ground terminal, for being controlled by the third control signal in the switching mode and kept off in the linear mode;
    an inductor connected between the first node and a second node;
    a third transistor connected between the power input terminal and the second node, for being controlled by the first control signal in the linear mode and kept off in the switching mode; and
    a current sense resistor connected between the second node and the power output terminal.

4. The hybrid battery charger of claim 1, wherein the output stage comprises:

a first transistor connected between the power input terminal and a first node, for being controlled by the second control signal in the switching mode and kept off in the linear mode;

a second transistor connected between the first node and a ground terminal, for being controlled by the third control signal in the switching mode and kept off in the linear mode;

an inductor connected between the first node and a second node;

a current sense resistor connected between the second node and the power output terminal; and a third transistor connected between the power input terminal and the power output terminal, for being controlled by the first control signal in the linear mode and kept off in the switching mode.

5. A control circuit for a hybrid battery charger, comprising:

an error amplifier operative to generate a first error signal and a second error signal according to an output voltage and an output current of the hybrid battery charger;

a linear controller connected to the error amplifier, operative to generate a first control signal according to the first error signal;

a PWM controller connected to the error amplifier, operative to generate a second control signal and a third control signal according to the second error signal; and a multiplexer connected to the linear controller and the PWM controller, operative to select the first control signal or the second and third control signals according to a mode signal for the hybrid battery charger.

6. A control method for a hybrid battery charger, comprising the steps of:

generating a first error signal and a second error signal according to an output voltage and an output current of the hybrid battery charger;

generating a first control signal according to the first error signal;

generating a second control signal and a third control signal according to the second error signal; and according to a mode signal, selecting the first control signal to operate the hybrid battery charger in a linear mode or selecting the second and third control signals to operate the hybrid battery charger in a switching mode.

* * * * *